US007869382B2

(12) United States Patent
Hamedi et al.

(10) Patent No.: US 7,869,382 B2
(45) Date of Patent: Jan. 11, 2011

(54) NETWORK MANAGEMENT ASSISTED DISCOVERY

(75) Inventors: Mohamed Hamedi, Granite Bay, CA (US); Devon Dawson, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1587 days.

(21) Appl. No.: 11/006,427

(22) Filed: Dec. 6, 2004

(65) Prior Publication Data

US 2006/0120297 A1 Jun. 8, 2006

(51) Int. Cl.
*H04L 12/28* (2006.01)
*G01R 31/08* (2006.01)
*G06F 15/177* (2006.01)

(52) U.S. Cl. .................. 370/254; 370/401; 709/220
(58) Field of Classification Search .................. 370/465, 370/466, 467, 395.5, 254, 255, 400, 395.54, 370/257, 259, 260, 261, 329, 352, 265, 389; 709/219, 220, 221, 223, 224, 227, 238
See application file for complete search history.

(56) References Cited

U.S. PATENT DOCUMENTS

| | | | | |
|---|---|---|---|---|
| 5,696,899 A * | 12/1997 | Kalwitz | | 709/228 |
| 6,278,697 B1 * | 8/2001 | Brody et al. | | 370/310 |
| 6,684,241 B1 * | 1/2004 | Sandick et al. | | 709/220 |
| 6,775,244 B1 * | 8/2004 | Hattig | | 370/257 |
| 7,006,526 B1 * | 2/2006 | Biederman | | 370/466 |
| 7,099,285 B1 * | 8/2006 | Kanuri et al. | | 370/254 |
| 7,185,109 B2 * | 2/2007 | Conrad et al. | | 709/242 |
| 7,295,556 B2 * | 11/2007 | Roese et al. | | 370/395.3 |
| 7,324,462 B1 * | 1/2008 | Page et al. | | 370/255 |
| 7,386,605 B2 * | 6/2008 | Shah | | 709/221 |
| 7,421,483 B1 * | 9/2008 | Kalra | | 709/220 |
| 7,433,942 B2 * | 10/2008 | Butt et al. | | 709/223 |
| 7,502,372 B2 * | 3/2009 | Tsuchiya et al. | | 370/390 |
| 7,609,706 B2 * | 10/2009 | Scott et al. | | 370/410 |
| 2004/0083285 A1 * | 4/2004 | Nicolson | | 709/224 |
| 2004/0133704 A1 * | 7/2004 | Krzyzanowski et al. | | 709/250 |
| 2005/0050225 A1 * | 3/2005 | Tatman | | 709/244 |

OTHER PUBLICATIONS

Frame Formats,[webpages] [online]. Retrieved on Dec. 2, 2004. Retrieved from the internet: http://www.cisco.com/univercd/cc/td/doc/product/lan/trsrb/frames.pdf. Total pp. 22.

* cited by examiner

*Primary Examiner*—Hanh Nguyen

(57) ABSTRACT

In one embodiment of the invention, a method for network management assisted discovery, includes performing a discovery of network devices in a network; and sending gathered information associated with a first device that supports a first discovery protocol to a second device that supports a second discovery protocol. In another embodiment of the invention, an apparatus for network management assisted discovery, includes a management computer configured to perform a discovery of network devices in a network, and to send gathered information associated with a first device that supports a first discovery protocol to a second device that supports a second discovery protocol.

18 Claims, 3 Drawing Sheets

NETWORK MANAGEMENT ASSISTED DISCOVERY

TECHNICAL FIELD

Embodiments of the invention relate generally to communication networks, and more particularly to a network management assisted discovery method and apparatus.

BACKGROUND

Network devices can communicate with each other in a network by use of protocols such as a device discovery mechanism. Typically, a network device in a network will require a device discovery mechanism, so that the network device can identify other devices in the network and communicate with the other devices in the network. The device discovery mechanism permits the network device to, for example, learn about the device types among neighboring devices, the capabilities of the neighboring devices, and the addresses of the neighboring devices in the network. The device discovery mechanism also permits the network device to advertise its addresses and its capabilities.

One current device discovery mechanism is the CDP (Cisco Discovery Protocol) protocol from Cisco Systems, Inc., San Jose, Calif. Other discovery mechanisms include, for example, the Ironview® Network Manager from Foundry Networks, Inc., Alviso, Calif., and LLDP (Link Layer Discovery Protocol) which is an open standard for device discovery and physical topology discovery.

In current technology, however, if two devices in a network do not have the same discovery protocol in their firmware, then the two devices will not be able to discover each other. For example, a device with the CDP protocol will not be able to discover another network device that does not have the CDP protocol, or a device with a particular version of a particular discovery protocol will not be able to discover another network device with a different version of the same particular discovery protocol.

Therefore, the current technology is limited in its capabilities and suffers from at least the above constraints and deficiencies.

SUMMARY OF EMBODIMENTS OF THE INVENTION

In one embodiment of the invention, a method for network management assisted discovery, includes performing a discovery of network devices in a network; and sending gathered information associated with a first device that supports a first discovery protocol to a second device that supports a second discovery protocol. The method may also include the following: based upon the gathered information, configuring the second device so that the first and second device can communicate with each other.

In another embodiment of the invention, an apparatus for network management assisted discovery, includes a management computer configured to perform a discovery of network devices in a network, and to send gathered information associated with a first device that supports a first discovery protocol to a second device that supports a second discovery protocol.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
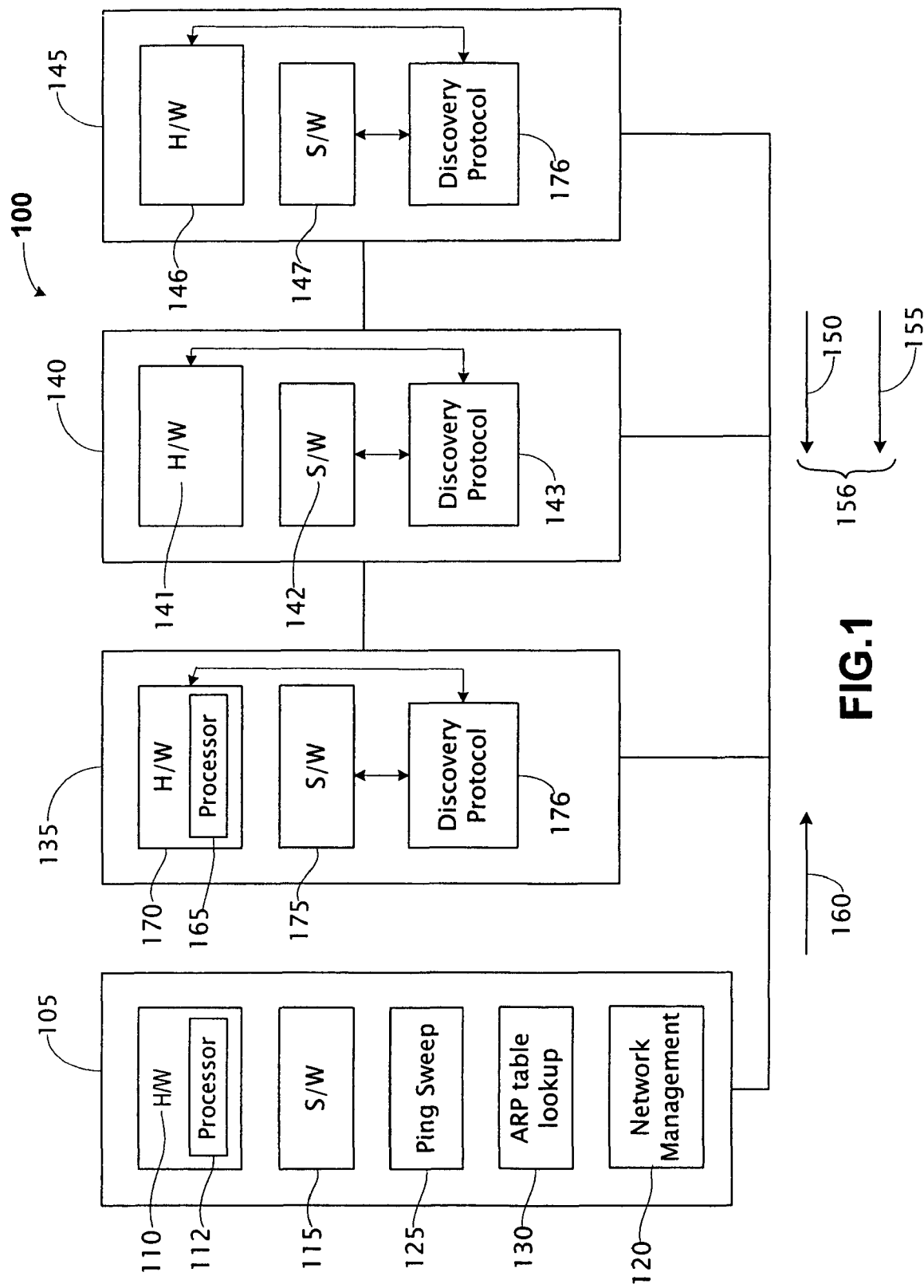
FIG. 1 is a block diagram of a network system in accordance with an embodiment of the invention.

FIG. 1 is a block diagram of a network 100, in accordance with an embodiment of the invention. The network 100 is typically, for example, a local area network (LAN), although other suitable communication networks may be used. A management computer 105 is attached to the network 100. The management computer 105 may be, for example, a personal computer, server, notebook computer, laptop computer, or another suitable computing device as known to those skilled in the art.

The management computer 105 includes standard hardware components 110 which include a processor 112, and software (and/or firmware) components 115. The hardware components 110 and software components 115 permit the management computer 105 to perform computing operations. Other various known components and modules that permit the management computer 105 to perform computing operations or to interface in the network 100 are not shown in FIG. 1 for purposes of describing functionalities of embodiments of the invention.

The management computer 105 also includes a network management application 120 that uses a ping sweep or ARP (address resolution protocol) table lookup in order to perform high level discovery of the devices on the network 100. The network management application 120 uses the ping sweep or ARP table lookup to determine the network topology information and to gather the device-related information and network-related information from the devices in the network 100. A ping sweep module 125 can provide the software and/or other components that permit the ping sweep functionality to be performed. An ARP table lookup table 130 can provide the software and/or other components that permit the ARP table lookup table functionality to be performed.

One example of a product the performs the ping sweep and ARP table lookup functionalities is of the type known as PROCURVE MANAGER™ which is commercially available from HEWLETT-PACKARD COMPANY. As known to those skilled in the art, ARP is a method for finding a host's Ethernet address from its Internet address. The sender broadcasts an ARP packet containing the Internet address of another host and waits for it (or some other host) to send back its Ethernet address. Each host maintains a cache of address translations to reduce delay and loading. ARP is defined in RFC 826. As also known to those skilled in the art, a ping sweep (also known as an ICMP sweep) is a basic network scanning technique used to determine which of a range of IP addresses map to live hosts (computers). A ping sweep sends ICMP (Internet Control Message Protocol) ECHO requests to multiple hosts. If a given address is live, the address will return an ICMP ECHO reply in order to allow the user to resolve host names and save output to a file.

In accordance with an embodiment of the invention, the network management application 120 would then mimic the various discovery protocols in order to transmit or feed the required network topology information into the devices. As an example, assume that the network 100 includes a device 135 that supports a particular discovery protocol 176 (e.g., CDPv2). The hardware components 170 and software components 175 in the device 135 are configured to support the particular discovery protocol 176. In the example of FIG. 1, assume further that the network 100 includes a second device 140 that does not support the particular discovery protocol 176. In the example of FIG. 1, assume that the hardware components 141 and software components 142 in the device 140 supports a second discovery protocol 143 which differs from the first discovery protocol 176 or is different in version from the first discovery protocol 176. It is noted that the number of devices that can support the particular discovery protocol 176 and the number of devices that do not support the particular discovery protocol 176 may vary. Furthermore, the particular discovery protocol 176 supported by the device 135 may be other types of discovery protocols other than CDPv2.

As a further option, assume that a third device 145 includes hardware components 146 and software components 147 that support the first discovery protocol 176. However, it is noted that in embodiments of the invention, the third device 145 can be omitted in the network 100.

The devices 135, 140, and 145 may be any suitable devices in a network such as, for example, switches or routers. One example of a network device that supports the CDPv2 protocol is of the type under the product family known as PROCURVE™ switches which are commercially available from HEWLETT-PACKARD COMPANY. However, the devices shown in FIG. 1 may be other suitable types of devices in a network.

The devices 135, 140, and 145 include standard hardware components and software (and/or firmware) components that permit the devices 135, 140, and 145 to perform various standard network operations (e.g., switching functions, network connectivity functions, or/and other functions). The details of the various known components and modules that permit the devices 135, 140, and 145 to perform the standard network operations are not shown in FIG. 1 for purposes of focusing on the functionalities of embodiments of the invention. The network management application 120 would gather various information 156 relating to the device 140. These information 156 would include the device-related information 150 and network-related information 155 from the device 140. For example, the information 156 would permit the network management application 120 to learn about the device type, the capabilities of the devices in the network, and the addresses of the devices in the network, including the address of the devices that are neighbors to the device 140. In particular, the device-related information 150 or network-related information 155 would indicate, for example, the location of the device 140, the name or identifier of the device 140, the Internet Protocol (IP) address of the device 140, the devices connected to the device 140, the MAC (Media Access Control) address of the connected ports, the type of interconnection between the device 140 and neighboring devices (e.g., the device 140 ports that are connected to neighboring devices), and/or other information. Of course, the information in the device-related information 150 and network-related information 155 would depend on a manufacturer's specific implementation of the network device. As mentioned above, ping sweep or ARP table lookup may be used to gather the information 156.

The network management application 120 would then store the information 156 in the management computer 105 and then pass the information 156 to the device 135 (the CDPv2 device in this example), so that the device 135 learns about the device 140 and the capabilities and location of the device 140. Specifically, the network management software 120 would format the gathered information 156 into a packet 160 and transmit the packet 160 to the device 135. Therefore, in this example, the network management application 120 simulates, for example, the CDP discovery protocol, and the CDPv2-capable device 135 can discover, learn about, and communicate with the non-CDPv2 capable device 140. By parsing the packet 160, the CDPv2-capable device 135 can also discover and learn about the non-CDPv2-capable device 140 that is connected to the CDPv2-capable device 135. In effect, the management computer 105 operates as virtual CDP-capable device that permits the CDP-capable devices to learn about and communicate with the non-CDP capable devices, in this example. The processor 165 in the device 135 would receive and parse the packet 160, and configure the hardware components 170 (e.g., ports in the device 135) and/or software components 175 in the device 135 by use of standard device configuration techniques, so that the device 135 can learn about the device 140 and the capabilities and location of the device 140, and so that the device 135 can communicate with the device 140.

If the device 145 (a CDPv2-capable device in this example) is connected in the network 100, then the network management application 120 would also pass the gathered information 156 to the device 145.

Additionally, if an additional non-CDPv2-capable device (not shown in the example of FIG. 1) is connected in the network 100, then network management application 120 would gather the device-related information and network-related information from this additional non-CDPv2-capable device, and would then pass these device-related information and network-related information to the device 135 (the CDPv2-capable device in this example) and to any other CDPv2-capable devices in the network 100, so that the CDPv2-capable device 135 (and other CDPv2-capable devices in the network 100) learn about the additional non-CDPv2-capable device and the capabilities and location of the additional non-CDPv2-capable device.

Therefore, an embodiment of the invention would allow devices without a common discovery protocol to discover each other. In other words, the network management application 120 permits devices that might have older protocols or incompatible protocols to discover each other. Therefore, devices (with various non-compatible discovery protocols) can work together transparently to users.

When devices in the network 100 are configured to support new discovery protocols, the network management application 120 can be updated to understand these new discovery protocols and to allow the devices with the older protocol(s) to discover the devices with the new discovery protocol(s). The update made to the network management application 120 in order to understand a new discovery protocol would depend upon the details of the new discovery protocol and can be performed by known programming techniques.

Figure 2:
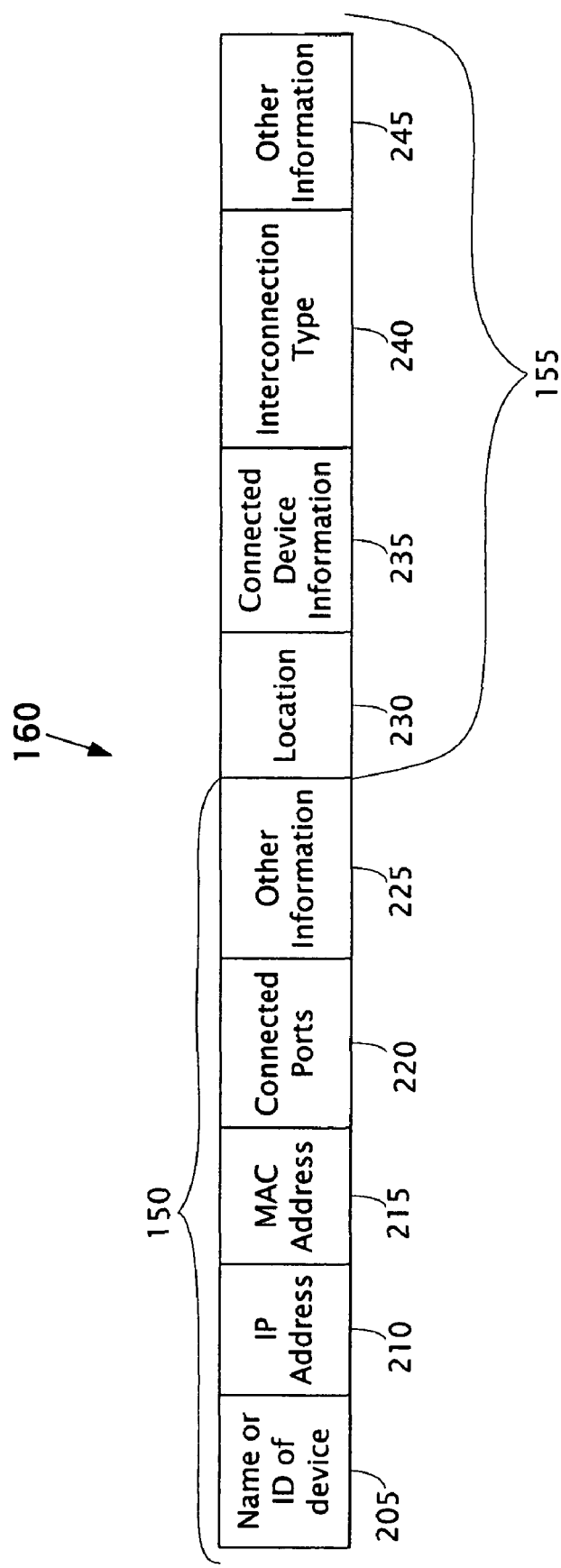
FIG. 2 is a block diagram of a packet that may be used in one embodiment of the invention.

FIG. 2 is a block diagram of a packet 200 that may be used in an embodiment of the invention. For example, if the device 135 (FIG. 1) supports the CDPv2 protocol, then the network management application 120 would format the packet 200 into a CDPv2 packet that the device 135 can receive and parse. The CDP protocol is described further in, for example, the following publication which is hereby incorporated herein by reference: CONFIGURING CISCO DISCOVERY PROTOCOL: CISCO IOS CONFIGURATION FUNDAMENTALS CONFIGURATION GUIDE However, as mentioned above, the devices in the network 100 in FIG. 1 can use other types of discovery protocols, and accordingly, the management software 120 can be configured or updated to understand these other types of discovery protocols. Typically, a third-party vendor provides a discovery protocol which is a mechanism or language that is used for communication between devices in the network 100.

The packet 160 includes device-related information 150, such as, for example, the name (or identifier) 205 of the device 140, the Internet Protocol (IP) address 210 of the device 140, the MAC (Media Access Control) address 215 of the connected ports, the connected ports 220, and/or other information 225 relating to the capability of the device 140.

The packet 160 also includes network-related information 155 such as, for example, the location 230 of the device 140, information 235 of devices connected to the device 140, the type 240 of interconnection between the device 140 and neighboring devices, and/or other network related information 245.

The particular format and contents in the packet 160 may differ, depending on the particular discovery protocol that is supported by the device 135 (FIG. 1).

Figure 3:
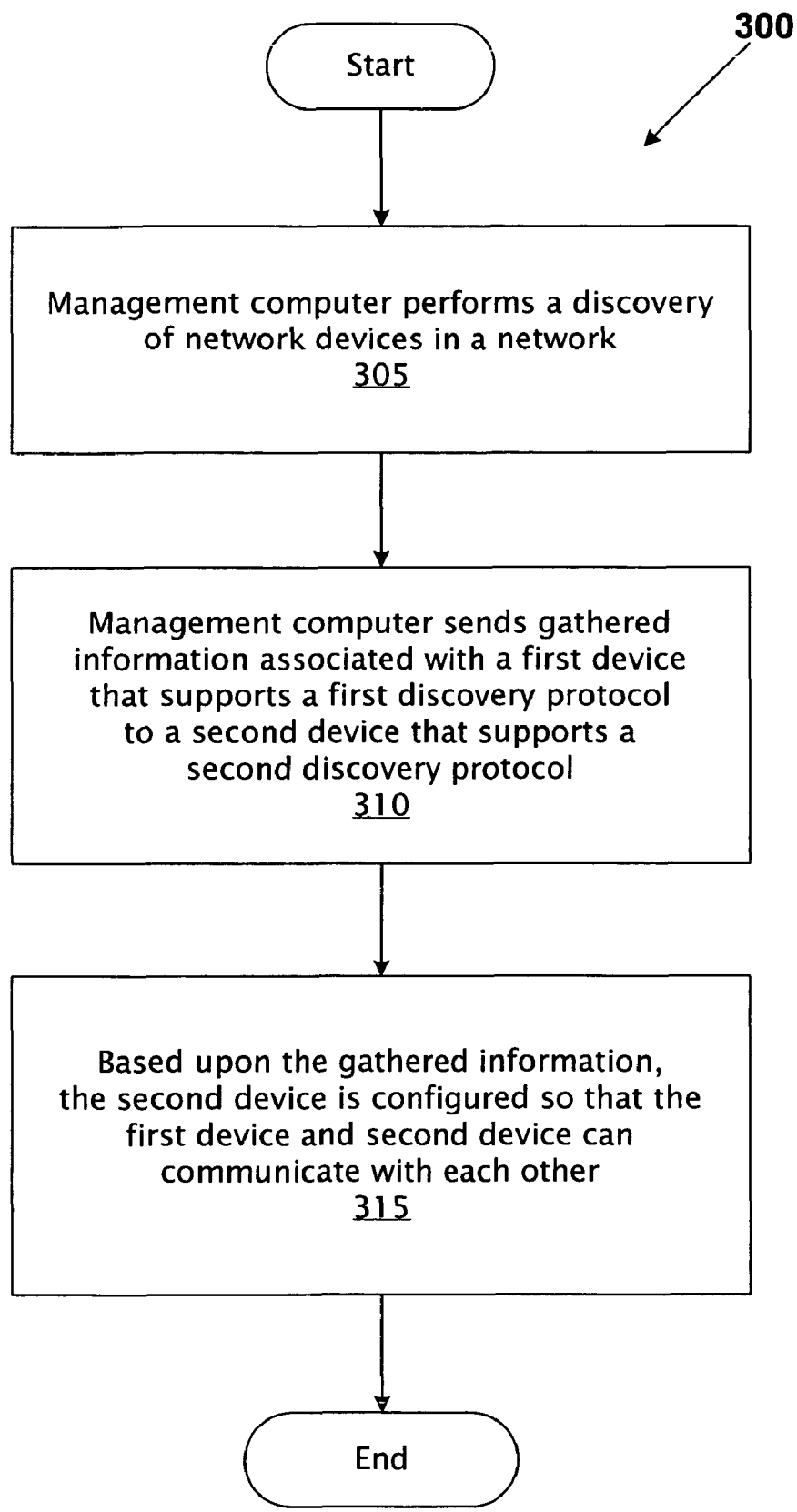
FIG. 3 is a method in accordance with an embodiment of the invention.

FIG. 3 is a method 300 in accordance with an embodiment of the invention. In block 305, a management computer performs a discovery of network devices in a network. In block 310, the management computer sends gathered information associated with a first device that supports a first discovery protocol to a second device that supports a second discovery protocol. In block 315, based upon the gathered information, the second device is configured so that the first device and second device can communicate with each other.

Various elements in the drawings may be implemented in hardware, software, firmware, or a combination thereof.

The various engines, applications, or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names (e.g., network management application 120), variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for network management assisted discovery, said method comprising:
    performing, by a management computer, a discovery of network devices in a network so as to gather first information of and from a first device and second information of and from a second device, wherein the first device supports a first discovery protocol and wherein the second device supports a second discovery protocol different from said first discovery protocol; and
    sending, by the management computer, said first information to said second device in a format supported by said second discovery protocol.

2. The method of claim 1, further comprising:
    based upon the information of the first device sent to the second device, configuring the second device so that the first device and second device can communicate with each other.

3. The method of claim 2, wherein the said first device, and second device communicate with each other but not through said management computer.

4. The method of claim 3, wherein the network comprises a local area network.

5. The method of claim 1, further comprising:
formatting the gathered information into a packet, prior to sending the gathered information to the second device.

6. The method of claim 1, wherein the gathered information comprises device-related information of the first device.

7. The method of claim 1, wherein the gathered information comprises network-related information of the first device.

8. The method of claim 1, wherein the first device comprises one of: a switch or a router.

9. The method of claim 1, wherein the second device comprises one of: a switch or a router.

10. The method of claim 1, wherein the first discovery protocol differs in type from the second discovery protocol.

11. An apparatus for network management assisted discovery, the apparatus comprising: a management computer for
performing a discovery of network devices in a network so as to gather first information of and from a first device and second information of and from a second device, wherein the first device supports a first discovery protocol and wherein the second device supports a second discovery protocol different from said first discovery protocol, and
for sending said first information to said second device in a format supported by said second discovery protocol.

12. The apparatus of claim 11, wherein the management computer further provides for configuring the second device so that the first device and second device can communicate with each other based upon the information of the first device sent to the second device.

13. An article of manufacture, comprising:
a computer-readable medium having stored thereon instructions that are executed by a processor to permit a management computer to:
perform a discovery of network devices in a network so as to gather first information of and from a first device and second information of and from a second device, wherein said first device supports a first discovery protocol and said second device supports a second discovery protocol different from said first discovery protocol; and
send the information of said first device to said second device in a format supported by said second discovery protocol.

14. A method comprising:
a management computer performing discovery of a first device using a first discovery protocol so as to obtain first discovery data, said first device being a switch or a router not configured to support a second discovery protocol;
said management computer performing discovery of a second device using said second discovery protocol so as to obtain second discovery data, said second device being a switch or router not configured to support said first discovery protocol; and
said management computer providing to said first device said second discovery data in a format supported by said first discovery protocol but not supported by said second discovery protocol.

15. A method as recited in claim 14 comprising, in response to receipt by said first device of said second discovery data, reconfiguring said first device so that it can communicate with said second device.

16. A method as recited in claim 15 wherein in response to said reconfiguring, said first and second devices communicate with each other directly rather than through said management computer.

17. A management computer comprising hardware and software components cooperatively configured to:
perform discovery of a first device using a first discovery protocol so as to obtain first discovery data, said first device being a switch or a router not configured to support a second discovery protocol;
perform discovery of a second device using said second discovery protocol so as to obtain second discovery data, said second device being a switch or router not configured to support said first discovery protocol; and
provide to said first device said second discovery data in a format supported by said first discovery protocol but not supported by said second discovery protocol.

18. A management computer as recited in claim 17 wherein said management computer provides for reconfiguring said first device so that said first and second devices can communicate with each other directly rather than through said management computer.

* * * * *

UNITED STATES PATENT AND TRADEMARK OFFICE
CERTIFICATE OF CORRECTION

| | | |
|---|---|---|
| PATENT NO. | : 7,869,382 B2 | Page 1 of 1 |
| APPLICATION NO. | : 11/006427 | |
| DATED | : January 11, 2011 | |
| INVENTOR(S) | : Mohamed Hamedi et al. | |

It is certified that error appears in the above-identified patent and that said Letters Patent is hereby corrected as shown below:

In column 6, line 65, in Claim 3, delete "device," and insert -- device --, therefor.

Signed and Sealed this
Eleventh Day of September, 2012

David J. Kappos
*Director of the United States Patent and Trademark Office*